United States Patent [19]

Chung

[11] Patent Number: 5,460,686
[45] Date of Patent: Oct. 24, 1995

[54] APPARATUS FOR SYNCHRONOUS PRODUCTION OF A SHIRT COVERING AND RAINCOAT

[76] Inventor: Wen-Hui Chung, No. 15-3, Hsin Cheng N. Road, Su-Ao Chen, I-Lan Hsien, Taiwan

[21] Appl. No.: 146,725

[22] Filed: Nov. 4, 1993

[51] Int. Cl.$^6$ .......................... B32B 35/00; B32B 31/10; B32B 31/18; B32B 31/20
[52] U.S. Cl. .......................... 156/522; 156/510; 156/512; 156/543; 156/552; 156/553; 156/583.1
[58] Field of Search ..................... 156/510, 512, 156/522, 543, 552, 553, 583.1, 598

[56] References Cited

U.S. PATENT DOCUMENTS

| | | | |
|---|---|---|---|
| 3,940,307 | 2/1976 | Rivman et al. | 156/552 X |
| 4,079,466 | 3/1978 | Rosenstein | 156/290 X |
| 4,175,997 | 11/1979 | Muller | 156/553 X |
| 4,445,960 | 5/1984 | Niklasson | 156/553 X |
| 4,769,106 | 9/1988 | Busching | 156/553 X |

Primary Examiner—David A. Simmons
Assistant Examiner—M. Curtis Mayes
Attorney, Agent, or Firm—Lowe, Price, LeBlanc & Becker

[57] ABSTRACT

The method of the invention includes steps of i) preparing a body material and a stack of cap materials; ii) cutting open one side of the body material; iii) sealing the cap materials to an opposite side of the body material; iv) continuously welding an arched sealing line on the body material between either two cap materials so as to form a series of curved raincoat bodies and a series shirt covering alternatively disposed on the body material; v) separating the shirt coverings from the curved raincoat bodies; and vi) packing the separated raincoats and shirt coverings separately. The machine for the method includes a sealing mechanism for sealing the cap materials to the body material, and a shape forming mechanism for continuously welding an arched sealing line on the body material between either two cap materials.

12 Claims, 16 Drawing Sheets

APPARATUS FOR SYNCHRONOUS PRODUCTION OF A SHIRT COVERING AND RAINCOAT

BACKGROUND OF THE INVENTION

The present invention relates to a method of producing raincoats and shirt coverings synchronously. The present invention also relates to a machine for said method.

A normal simple type raincoat is generally made of a big plastic bag and a small plastic bag sealed to the close side of the big plastic bag for making the cap. The two opposite corners of the close side of the big plastic bag is then cut into two openings for the cuffs. This simple structure of raincoat is lightweight, cheap, and convenient to carry, and therefore it is disposable. However, this disposable raincoat neither fit the body nor cause a sense of beauty. Under a strong wind, the cap may slip from the head, and the cuffs may be turned out to let rain water enter. There is provided an improved simple type of raincoats having a curved body portion. However, because the sleeves are separately made and then sealed to the body portion, the production process of this improved simple type of raincoats is complicated, and a big quantity of scraps will be produced during the production process. Another disadvantage of this improved simple type of raincoats is that the sealing lines of the sleeves may be torn off easily when one is wearing the raincoat.

Further, inflation machines are commonly used for making tubular base materials of different diameters, namely, the big tubular base material for making the raincoat body and the small tubular base material for making the cap. The small tubular base material is processed through a side sealing & cutting machine into small bags and then respectively sealed to a respective raincoat body to serve as the cap. According to conventional simple raincoat production methods, the cap material is sealed to the raincoat body material manually. The sealing process is complicated and completed by: putting the raincoat body material on the bottom die, then putting the cap material on the raincoat body material, and then pulling down the sealing die to seal the cap material to the raincoat body material, and then pick up the undesired waste material from the materials being sealed so that the neck is formed on the materials being sealed. As the sealing process is manually operated, the production efficiency cannot be greatly improved, and the problem of high defective rate cannot be eliminated.

As conventional simple raincoats are mainly made of lightweight, thinner, big plastic bags, they are difficult to process through an automatic mass production process. Because the sleeves are respectively sealed to the raincoat body manually, the manufacturing cost is relatively increased.

SUMMARY OF THE INVENTION

The present invention has been accomplished under the aforesaid circumstances. It is therefore the principal object of the present invention to provide a shirt covering and raincoat synchronous production method which produces raincoats and shirt coverings synchronously. It is another object of the present invention to provide a shirt covering and raincoat synchronous production method which produces little waste materials during the production of shirt coverings and raincoats. It is still another object of the present invention to provide a shirt covering and raincoat synchronous production method which automatically produces raincoats that fit the body. It is still another object of the present invention to provide a shirt covering and raincoat synchronous production method which greatly reduces the manufacturing cost of raincoats. It is still another object of the present invention to provide a machine for the shirt covering and raincoat synchronous production method which seals cap materials to a raincoat body material automatically through an automatic sealing mechanism to minimize labor consumption and to reduce waste materials and defective rate. It is a yet further object of the present invention to provide a machine for the shirt covering and raincoat synchronous production method which automatically fasten a tire wire to the cap of the raincoat to be produced.

DETAILED DESCRIPTION OF THE PREFERRED EMBODIMENT

Figure 1:
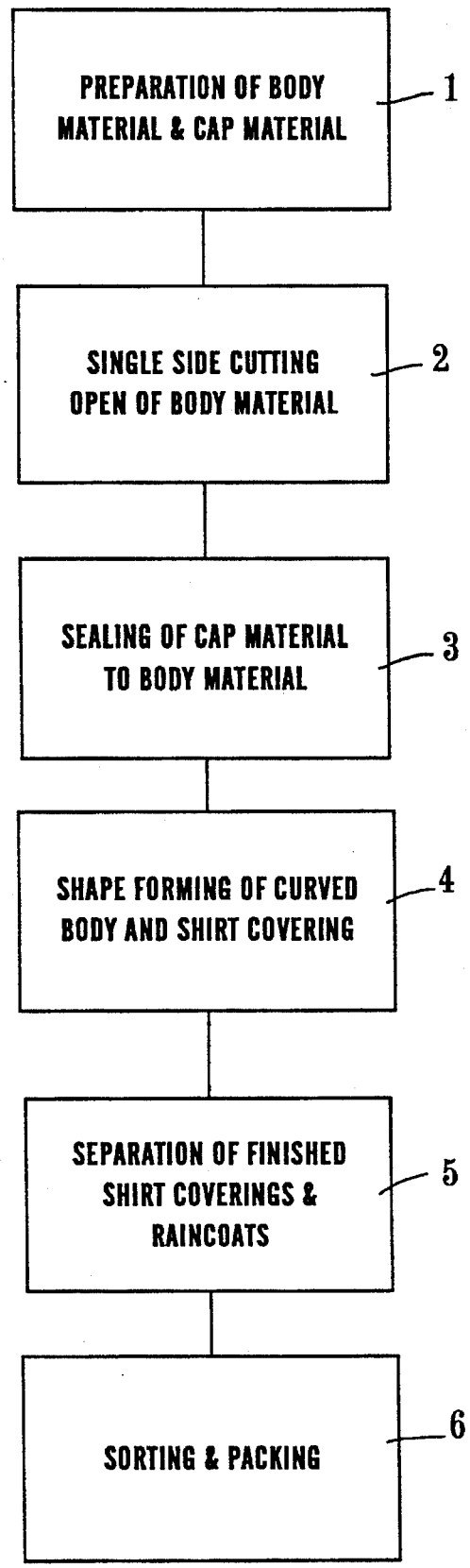
FIG. 1 is a block diagram of a shirt covering and raincoat synchronous production method according to the present invention.
Figure 2:
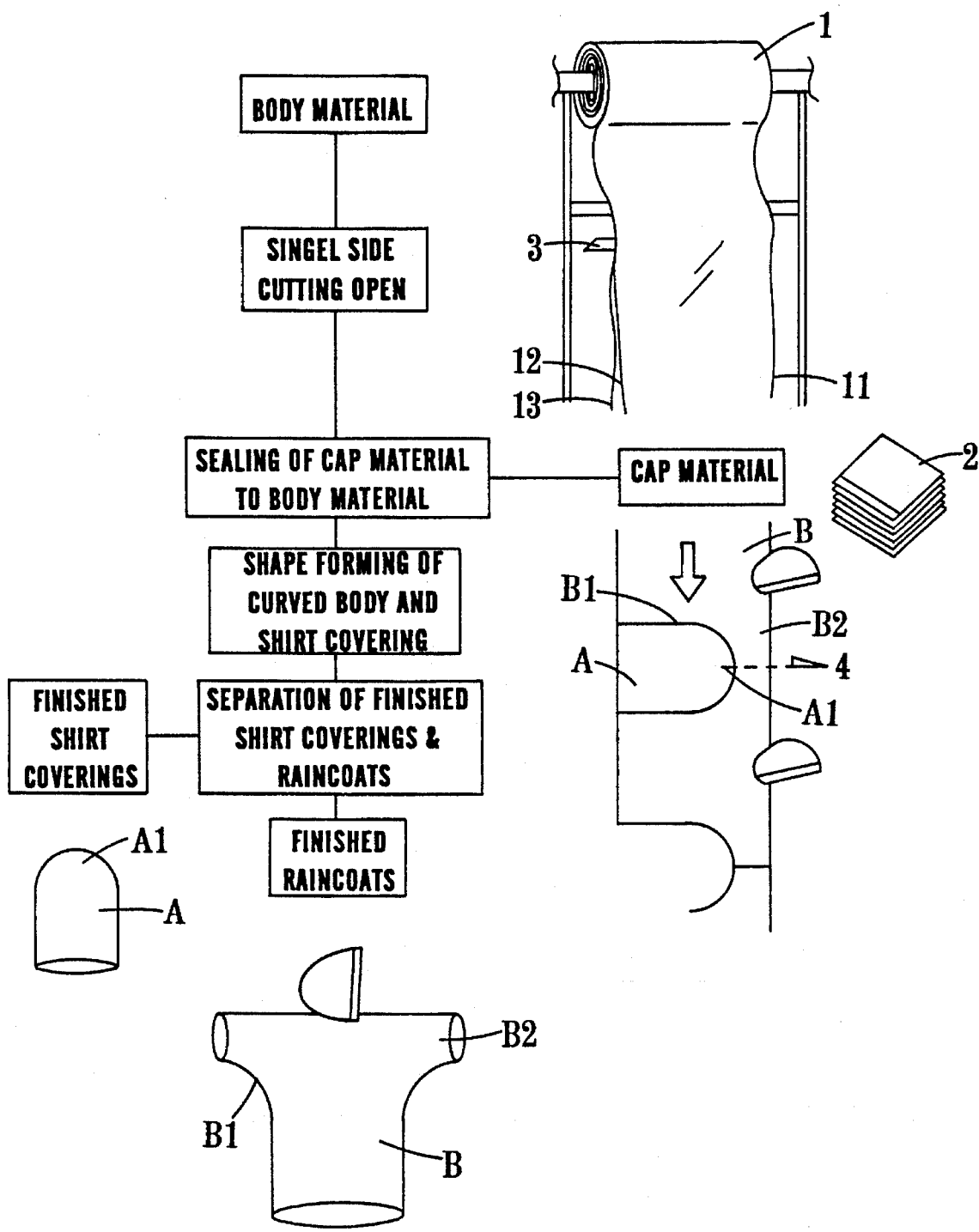
FIG. 2 is a production flow chart of the shirt covering and raincoat synchronous production method of FIG. 1.

Referring to FIGS. 1 and 2, the method of the present invention is to simultaneously produce short coverings A and raincoats B with curved side edges B1, which includes steps of:

i) preparing a body material 1 and a cap material 2;

ii) cutting open one side of the body material 1;

iii) sealing the cap material 2 to an opposite side of the body material 1;

iv) curved raincoat body and shirt covering shape forming process;

v) separating finished shirt coverings and raincoats from one another; and vi) sorting and packing.

Figure 3:
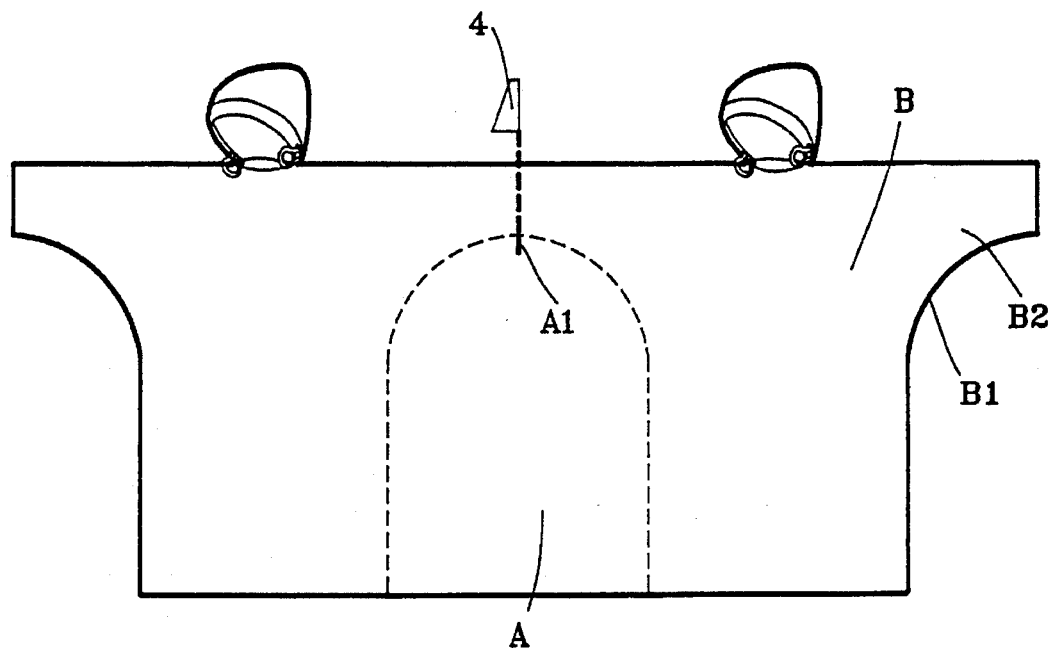
FIG. 3 shows finished shirt coverings and raincoats cut from one another according to the present invention.
Figure 4A:
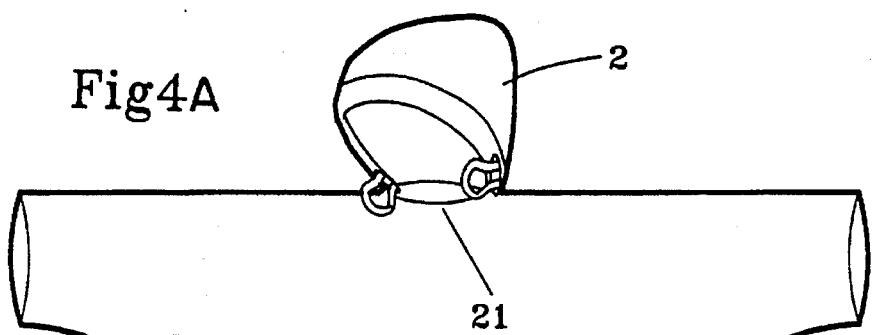
FIG. 4A shows a finished raincoat according to the present invention.
Figure 4B:
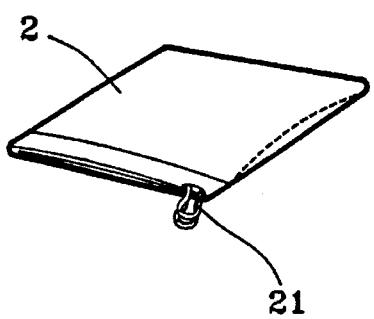
FIG. 4B shows the folded cap portion of the raincoat of FIG. 4A.
Figure 5:
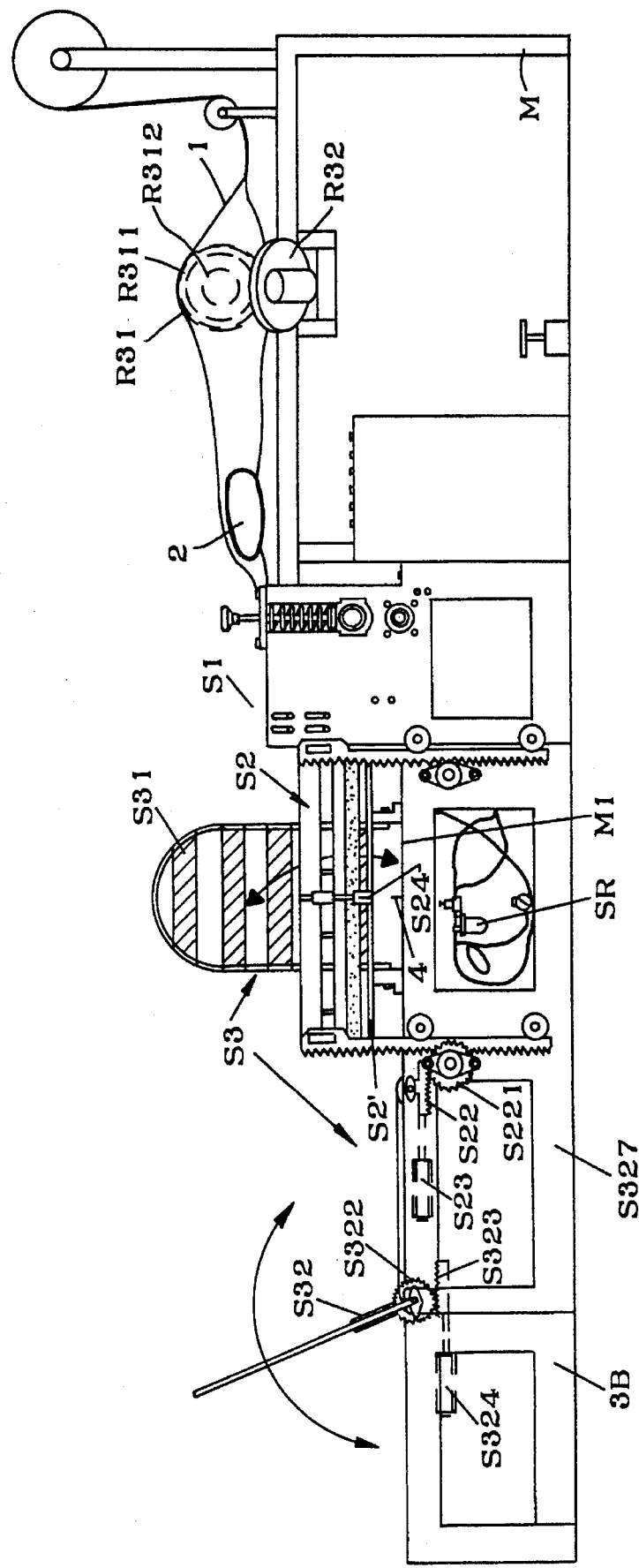
FIG. 5 is a side view of a machine for the method of FIG. 1.

Referring to FIGS. 3 and 4 and FIG. 2 again, the body material 1 is an elongated sheet of a big plastic bag wound round a reel; the cap material 2 is a stack of small plastic bags. As the body material 1 is fed into the machine from the rear end thereof, one side of the body material 1 is cut open by a first cutter 3 (the opening is further formed into the bottom opening of the raincoat to be made). The opposite side 11 of the body material 1 is then sealed with the cap material 2, and then delivered forwards for further curved raincoat body and shirt covering shape forming process at a shape forming station. At this shape forming station, the front piece 12 and back piece 13 of the body material 1 are sealed with curved side edges B1, and therefore a raincoat B and a shirt covering A are simultaneously shape formed. At the same time, a second cutter 4 is operated to cut the raincoat B and the shirt covering A from each other. The finished raincoat B and the finished shirt covering A are then separately packed. As the cutter 4 cuts through the processed body material 1, sleeve opening B2 is formed, and a hanging hole A1 is simultaneously formed on the shirt covering A for hanging a garment hanger (see FIG. 3). Before sealing the cap material 2 to the body material 1, a loop of tie wire 21 may be fastened to the cap material 2 through an automatical fastening mechanism (see FIG. 4A and 4B).

Referring to FIGS. 5, 6, 7, and 8, the mechanism of the machine for sealing the cap material 2 to the body material 1 comprises a locating frame R1, a belt conveyer R2, and a sealing die set R3. The locating frame R1 is made from a substantially I-shaped hollow frame having a short bottom rod R11 affixed to the machine base M at the top, and a long top tube R12 transversely spaced above the machine base M. The belt conveyer R2 is installed in the long top tube R12 of the locating frame R1, comprised of a motor R21, and a transmission belt assembly R22 driven by the motor R21 to turn an endless conveying belt R221. The endless conveying belt R221 comprises a series of equally spaced teeth R222 around the outside wall thereof. The sealing die set R3 comprises a circular bottom die R31 mounted on the rear end of the long top tube R12 of the locating frame R1, and a circular sealing die R32. The bottom die R31 comprises a center through hole R312 in line with the long top tube R12, and an annular, heat resisting plastic cushion R311 on an inner side thereof around the center through hole R312. The sealing die R32 comprises a blocked die body R322, a heat sealing source R321 on an inner side of the blocked die body R322 for sealing, an air nozzle R323 in the center of the blocked die body R322. There is provided a first cutter 3 mounted on the short bottom rod R11 of the locating frame R1 to cut open one side of the body material 1, for permitting the body material 1 to pass over the locating frame R1. At the same time, the cap material 2 is delivered to the bottom die R31. As the cap material 2 stays at the bottom die R31, the sealing die R32 is closed on the bottom die R31, causing the heat sealing source R321 pressed on the body material 1 and the cap material 2 against the bottom die R31. At the same time, the air nozzle R323 sends out a current of air to expand the waste material 14 being surrounded within the sealing line, causing the waste material 14 to be carried away by the teeth R222 of the belt conveyer R22 and moved to the opposite end of the long top tube R12 of the locating frame 12.

Figure 9:
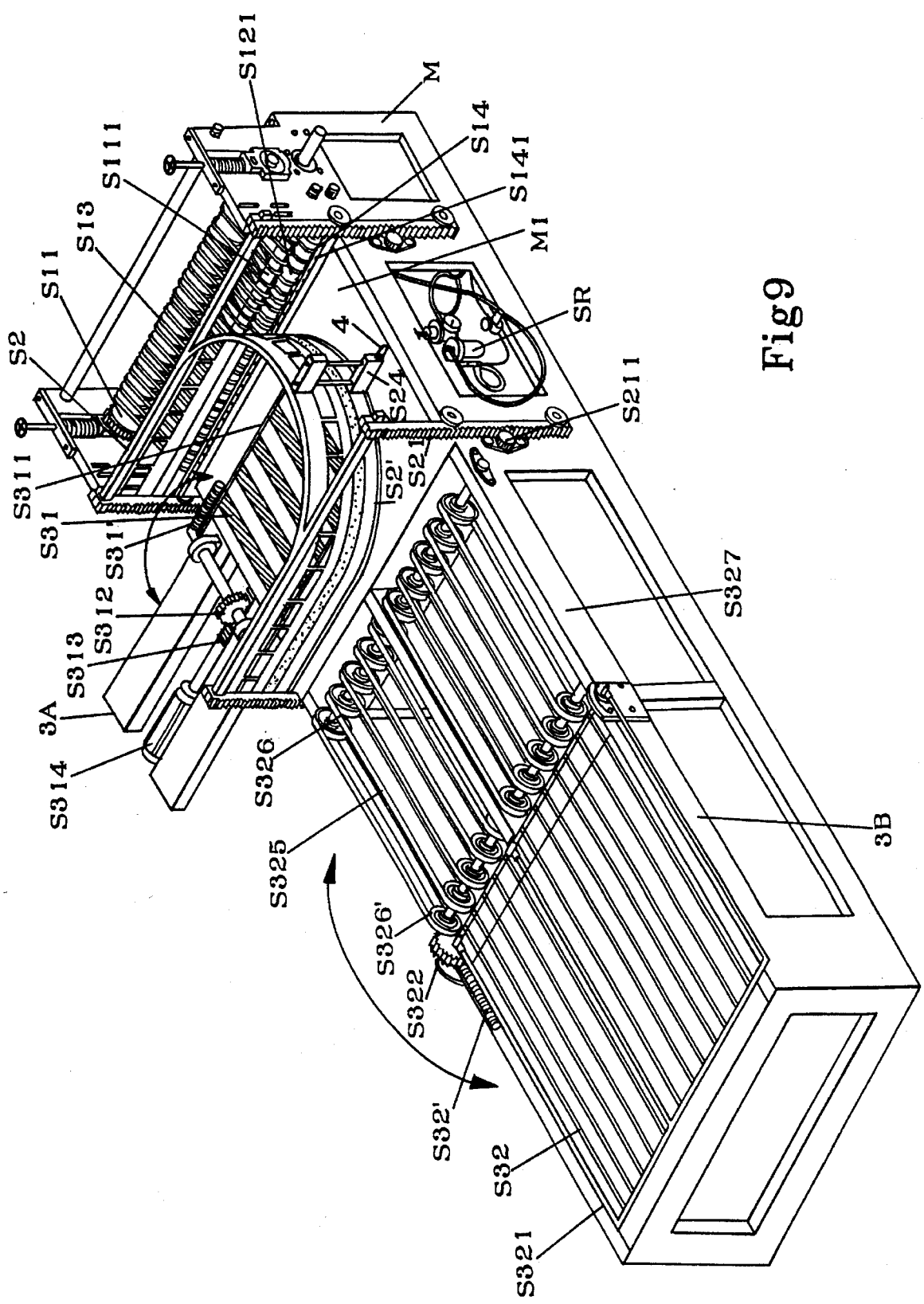
FIG. 9 is a perspective view of the shape forming mechanism of the machine of FIG. 5.
Figure 10:
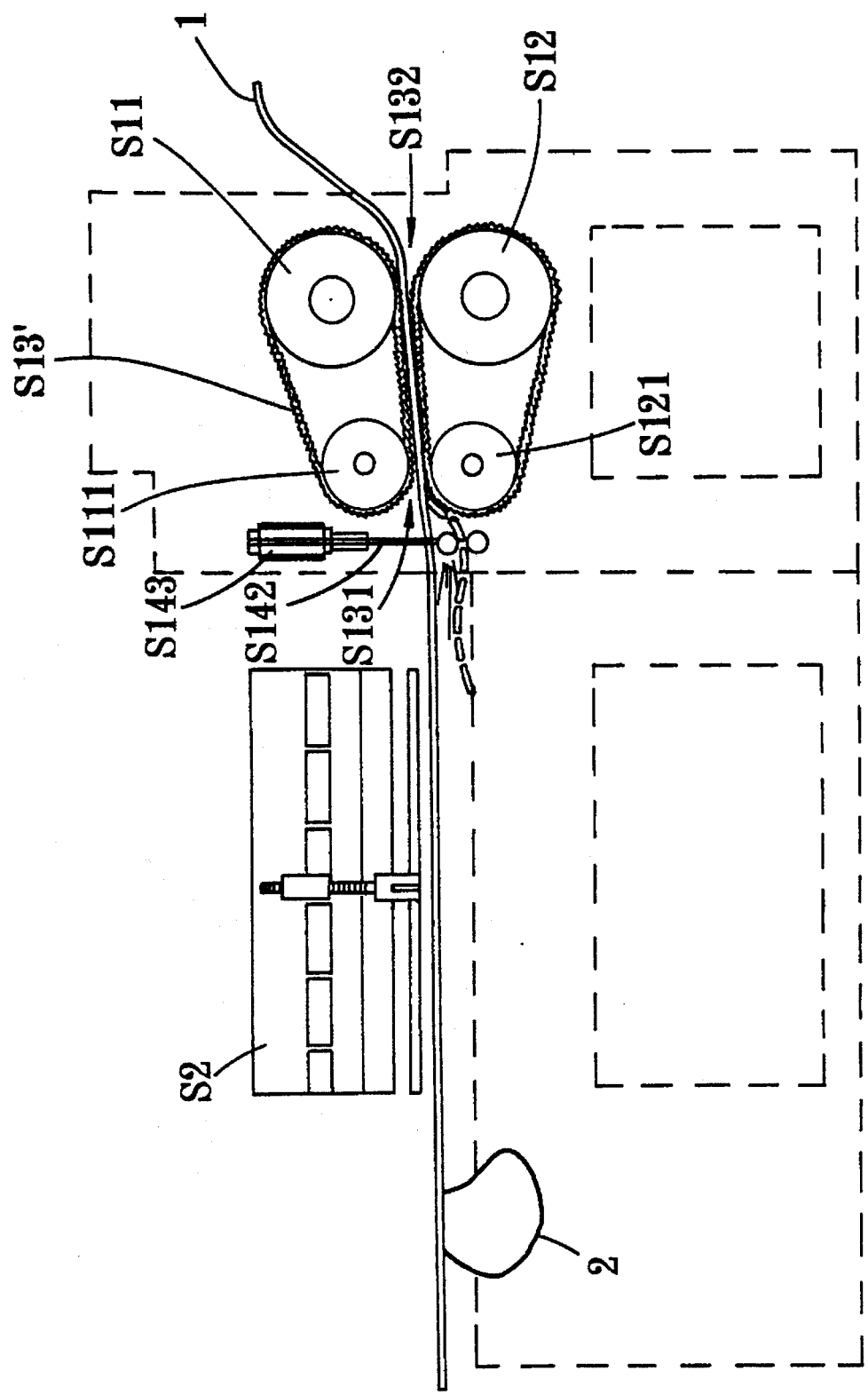
FIG. 10 is a plain view of the intermediate shifting mechanism of the shape forming mechanism of FIG. 9.
Figure 11:
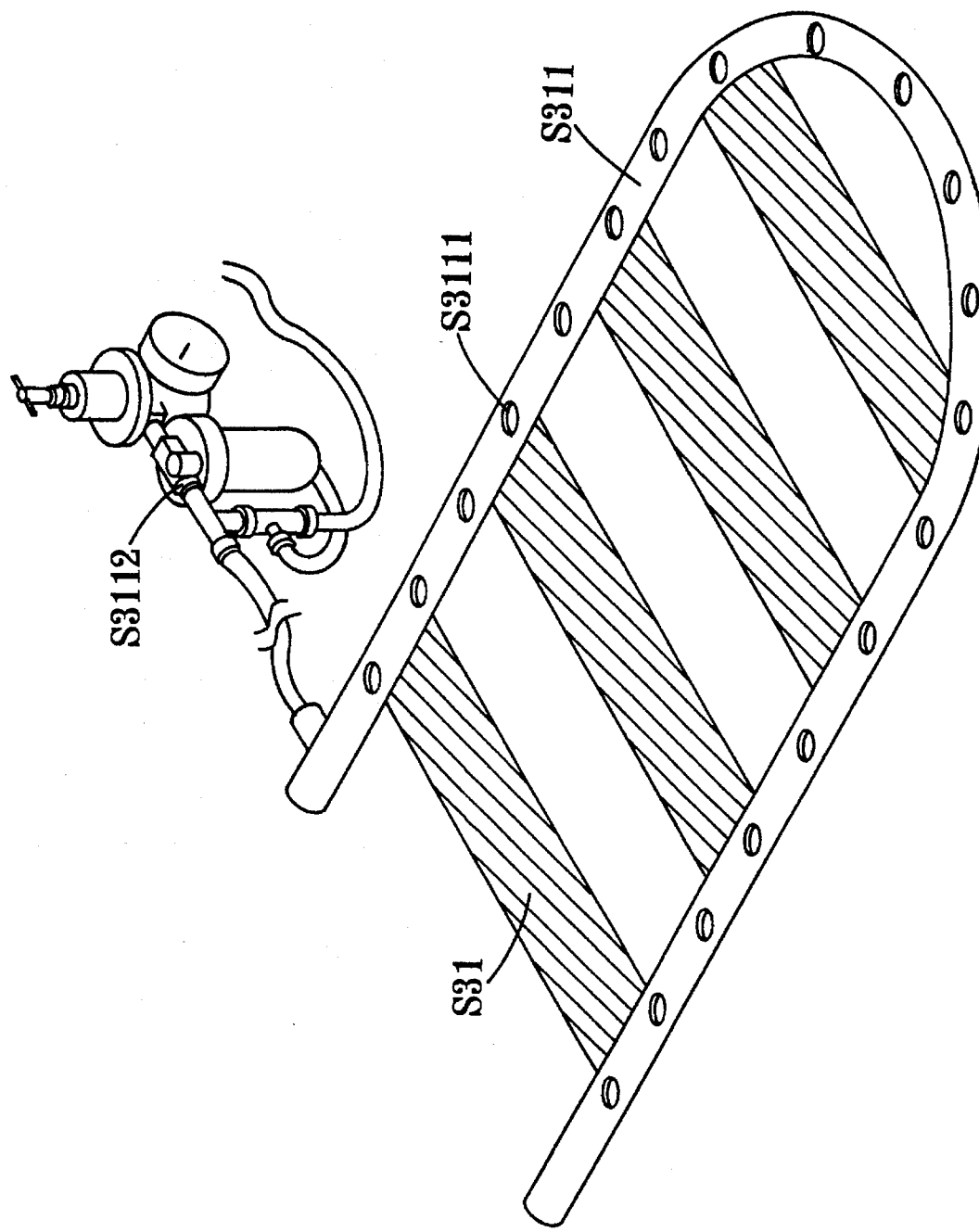
FIG. 11 is an elevational view of the first netting device of the sorting conveyer of the shape forming mechanism of FIG. 9.

Referring to FIGS. 9, 10, and 11, and FIGS. 5 and 6 again, the mechanism for the shape forming of curved body and shirt covering is mounted on the machine base M, comprised of an intermediate shifting mechanism S1, a sealing die set S2, and a sorting conveyer S3. The intermediate shifting mechanism S1 is comprised of big rollers S11;12, small rollers S111;S112, and transmission belts S13. There is a nozzle tube S14 disposed in parallel with the intermediate shifting mechanism S1 at an elevation slightly below the output port S131 of the intermediate shifting mechanism S1. The nozzle tube S14 has a series of air nozzles S141 disposed in parallel with the top table M1 of the machine base M, through which air from an air supply device SR is ejected out of the nozzle tube S14. The sealing die set S2 is an arched sealing die reciprocated vertically above the top table M1 of the machine base M by an air pump S23 through a set of racks S21;S22 and a set of transmission gears S211;S221. The sealing die set S2 has a guide groove S24 on the arched top end thereof through which the second cutter 4 passes. The sorting conveyer S3 is comprised of two netting devices, namely, the first netting device S31 and the second netting device S32. The outer frame S311 or S321 of the netting device S31 or S32 has one side hinged to the machine base and an opposite side liftable. The first netting device S31 is made in an arched configuration in size relatively smaller than the sealing die set S2. As the first netting device S31 is disposed on the top table M1, it is received within the sealing die set S2. The outer frame S311 of the first netting device S31 comprises a gear S312 on the hinged side thereof meshed with a rack S313 and moved by an air pump S314 to alternatively turn the outer frame S311 on the top table of the machine base M. The second netting device S32 is mounted on a locating frame S327 on the rear end of the top table M1. The locating frame S327 comprises a front flywheel assembly S326, a rear flywheel assembly S326', and a plurality of transmission belts S325 linked between the front flywheel assembly S326 and the rear flywheel assembly S326'. The outer frame S321 of the second netting device S31 comprises a gear S322 on the hinged side thereof meshed with a rack S323 and moved by an air pump S324. After the body material 1 was welded with the cap material 2 and sent into the intermediate shifting mechanism S1 from the input port S132 thereof, it is then delivered out of the intermediate shifting mechanism S1 through the output port S131 thereof and then blown by the currents of air being driven out of the air nozzles S141 of the nozzle tube S14. At the same time, the front and rear flywheel assemblies S326;S326' and the transmission belts S325 of the locating frame S327 are operated to produce wind waves, causing the body material to fully extend out and to float above the top table M1 of the machine base M. As the body material 1 with the welded cap material 2 are moved to the second netting device S32, the air pump S23 is operated to move the racks S22;S221 and the gears S221;S211, causing the sealing die set S2 to lower down, and therefore the front piece 12 and back piece 13 of the body material 1 are sealed with an arched welding line. As the front piece 12 and back piece 13 of the body material 1 are sealed, the second cutter 4 is moved to cut through the body material 1, and therefore the arched welding line is cut into two curved side edges B1. Immediately after the operation of the second cutter 4, the second netting device S31 is driven by the air pump S314 through the rack S313 and the gear S312 to lift the duly formed short covering A and to pile it up on a storage rack 3A adjacent to the first netting device S31. As the sealing die set S2 is lifted, a raincoat B having two opposite curved side edges B1 is simultaneously shape formed. The finished raincoat B is then lifted by the second netting device S32, by means of the operation of the air pump S324 and the rack S323 and the gear S322, and then piled up on a storage rack 3B adjacent to the second netting device S32. As the machine is continuously operated, raincoats B and shirt coverings A are continuously produced and separately piled up on the storage racks 3A;3B.

Referring to FIGS. 12, 13, 14, 15, 16, and 17, the loop of tie wire 21 is fastened to the cap material 2 through an automatic garbage bag making machine MT. The garbage bag making machine MT comprises a feed guide assembly T1, and a sealing roller T2 assembly. The feed guide assembly T1 is comprised of an upper board T11, an intermediate board T12, and a lower board T13 vertically disposed one above another. The intermediate board T12 comprises a cutting blade T121, and a transverse support T14 for holding the upper and lower boards T11;T13. By means of the transverse support T14, the feed guide assembly T1 is mounted on the garbage bag making machine MT at one side. The upper and lower boards T11;T13 have a respective side slot T111 or T131 and a respective front slot T112 or T132. Wires 211;211' are respectively inserted through the side slots Till;T131 and then passed through the front slots T112;T132. As the feed guide assembly T1 is moved forward, the wires 211;211' are simultaneously carried forward. The sealing roller assembly T2 comprises an upright support T21, an upper sealing roller T22 and a lower sealing roller T23 supported on the upright support T21 at different elevations, a transmission belt T24 mounted between the upper and lower sealing rollers T22;T23. The upper and lower sealing rollers T22;T23 have a respective heat sealing source for sealing plastic films or the like. The rear output end of the feed guide assembly T1 is disposed toward the space between the upper and lower sealing rollers T22;T23. The upper and lower sealing rollers T22;T23 have a respective auxiliary rollers T221 or T231 that can be adjusted toward each other within a fixed range to ensure an accurate sealing effect. As the cylindrical plastic bag material 2T is fed forwards by the feed guide assembly T1, it is cut off by the cutting blade T121. At the same time, the wires 211;211' are simultaneously fed forwards, and then the sealing roller assembly T2 is operated to seal the the wires 211;211' to the duly cut plastic bag, and therefore a cap material with a loop of tie wire is thus obtained.

The structural features of the invention and possible modifications to be made thereto are explained hereinafter.

A) With respect to the mechanism for sealing the cap material to the body material (with reference to FIGS. 5, 6, 7, and 8):

i) The configuration of the mechanism must be having one side fixed and an opposite side opened for passing the body material 1.
  ii) The teeth R222 on the endless conveying belt R221 can be made by threading screw or fasting nails on a normal endless belt without making a new mold for the production of the endless conveying belt with teeth.
  iii) The circular sealing die R32 must have a uniform annular flange R324 on the inner side thereof; the heat sealing source R321 can be an electric heating wire covered within an insulator and set in a groove R325 on the annular flange R324. As the circular sealing die R32 is closed on the bottom die R31, the annular flange R324 presses the cap material 2 and the body material 1 on the plastic cushion R311, and therefore the cap material 2 and the body material 1 are heated and sealed together. When sealed, the waste material is disposed at an inner side, and therefore it can be conveniently blown up and then carried away by the teeth R222 of the endless conveying belt R221 without tearing the finished product.
  iv) The sealing die R32 may be supported on a link R33 reciprocated by an air pump R34.
  v) An annular nozzle tube R326 having a plurality of air nozzles R3261 may be mounted on the blocked outer surface R322' of the sealing die 32, through which air is driven out to cool down the sealing die R32 during the sealing process of the sealing die R32, and simultaneously to stretch open the cap material 2 so as to keep the cap material 2 away from the sealing die R32.
  vi) The aforesaid hardware structure is simple and can be quickly installed in the machine base M for a mass production with less defective rate.

Figure 6:
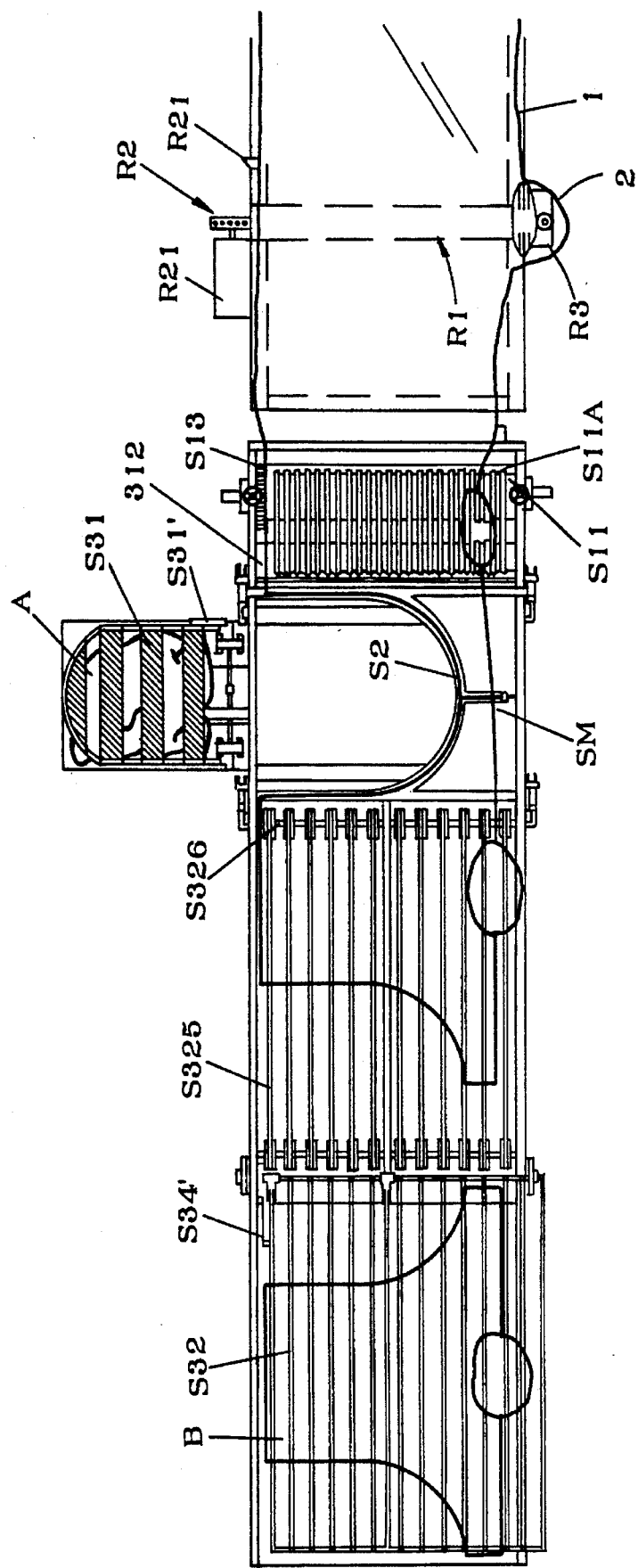
FIG. 6 is a top view of the machine of FIG. 5.
Figure 7:
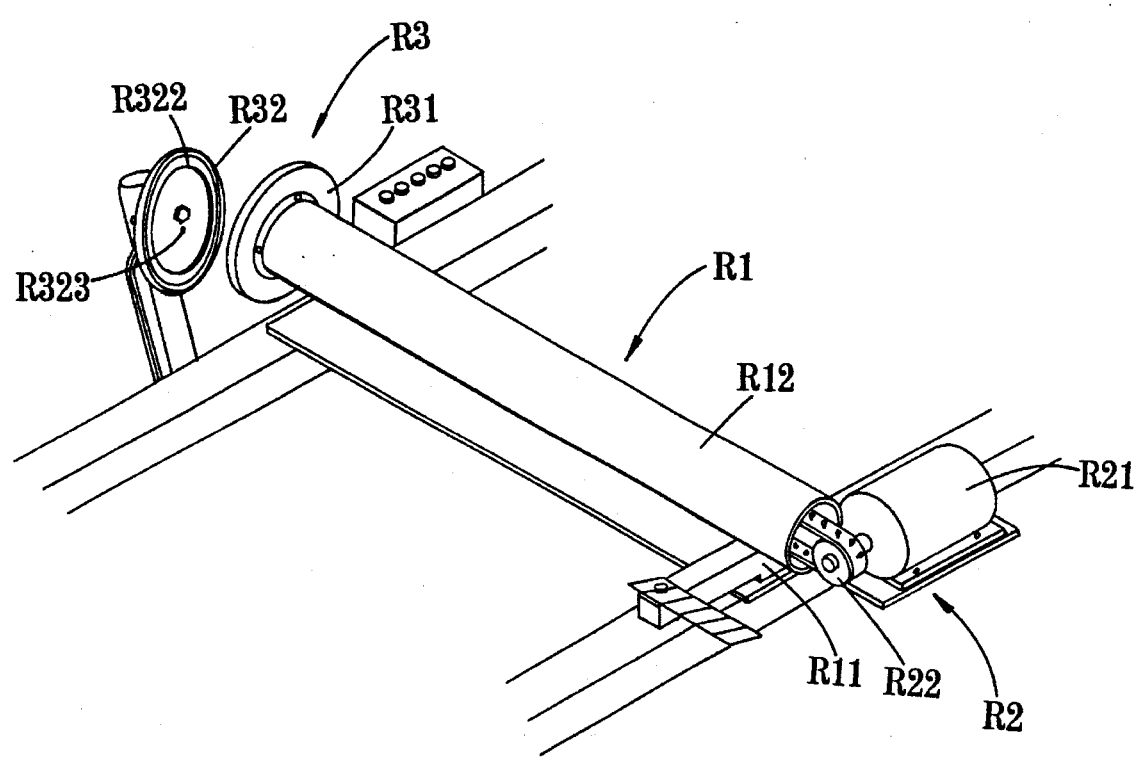
FIG. 7 is an elevational view in an enlarged scale of the sealing mechanism of the machine of FIG. 5 for sealing cap materials to a body material.
Figure 8:
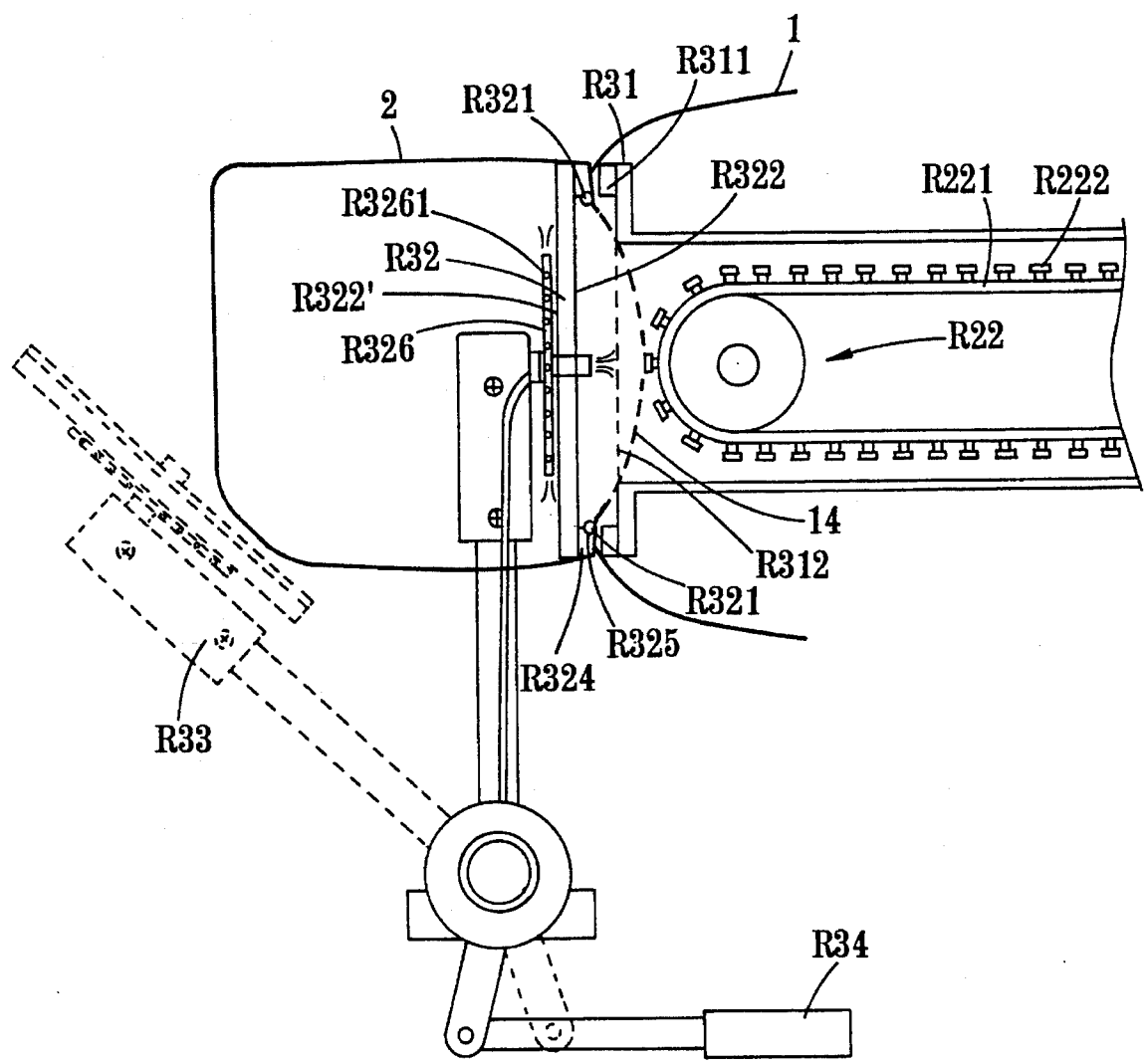
FIG. 8 sectional view of the sealing mechanism of FIG. 7.

B) With respect to the mechanism for the shape forming of curved raincoat body and shirt covering (with reference to FIGS. 5, 6, 9, 10, and 11):

i) As shown in FIGS. 6 and 10, in order not to produce a turbulent flow during the operation of the intermediate shifting mechanism S1, the coil springs S13' may be installed to replace the transmission belts S13; In order to prevent the cap material 2 from being torn off, notches S11A may be made on the big rollers S11;S12 for passing the cap material 2 smoothly.
  ii) As shown in FIGS. 9 and 10, the nozzle tube S14 may be coupled to a reciprocating rod S142 driven by an air pump S143 to alternatively move up and down so as to facilitate the stripping of shape formed material from the sealing die set S2. After each sealing operation of the sealing die set S2 and before the next feeding of the material, the air pump S143 is operated to reciprocate the nozzle tube S14 vertically, causing the shape formed material separated from the sealing die set S2 and the nozzle tube S14 and returned to the floating status for further processing. If the shape formed material is not completely separated from the sealing die set S2 and the nozzle tube S14, the body material will be wrinkled as the it is sent forwards again by the intermediate shifting mechanism S1.
  iii) As shown in FIG. 9, a spring pressure board S2' may be fastened around the sealing die set S2 and controlled to press on the material to be shape formed during each sealing operation of the sealing die set S2, and therefore the shape formed material will not be adhered to the sealing die set S2 as the sealing die set S2 is lifted after the process of heat sealing.
  iv) As shown in FIG. 11, the outer frame S311 of the first netting device S31 may be made of a hollow tube having a plurality of air holes S3111, and an air supply device such as suction device S3112 may be provided to produce a suction force for sucking up the duly made shirt covering A onto the first netting device S31 and simultaneously for drawing off air from the duly made shirt covering A.
  v) As shown in FIGS. 6 and 9, the netting structure of the first and second netting devices S31;S32 of the sorting conveyer S3 is formed of spaced binding tapes or elastic bands. The hinged side of the outer frame S311 or S321 of either netting device S31 or S32 is supported on a respective buffer spring S31' or S32', which buffer spring S31' or S32' is released to normal as the netting device S31 or S32 is turned to vertical, or stretched as the netting device S31 or S32 is turned to horizontal. This arrangement permits the first and second netting devices S31;S32 to be alternatively turned back and forth to smoothly transfer finished raincoats B and shirt coverings A from the top table M1 of the machine base M to the storage racks 3A;3B respectively without inducing much wind, and simultaneously reduces impact pressure acted by the netting devices S31;S32 onto the top table M1 and the locating frame S327.

vi) The mechanism for the shape forming of curved raincoat body and shirt covering is installed in the machine base posterior to the mechanism for sealing the cap material to the body material, and therefore the material can be continuously and automatically processed to form into a continuous series of raincoats and shirt coverings.

Figure 12:
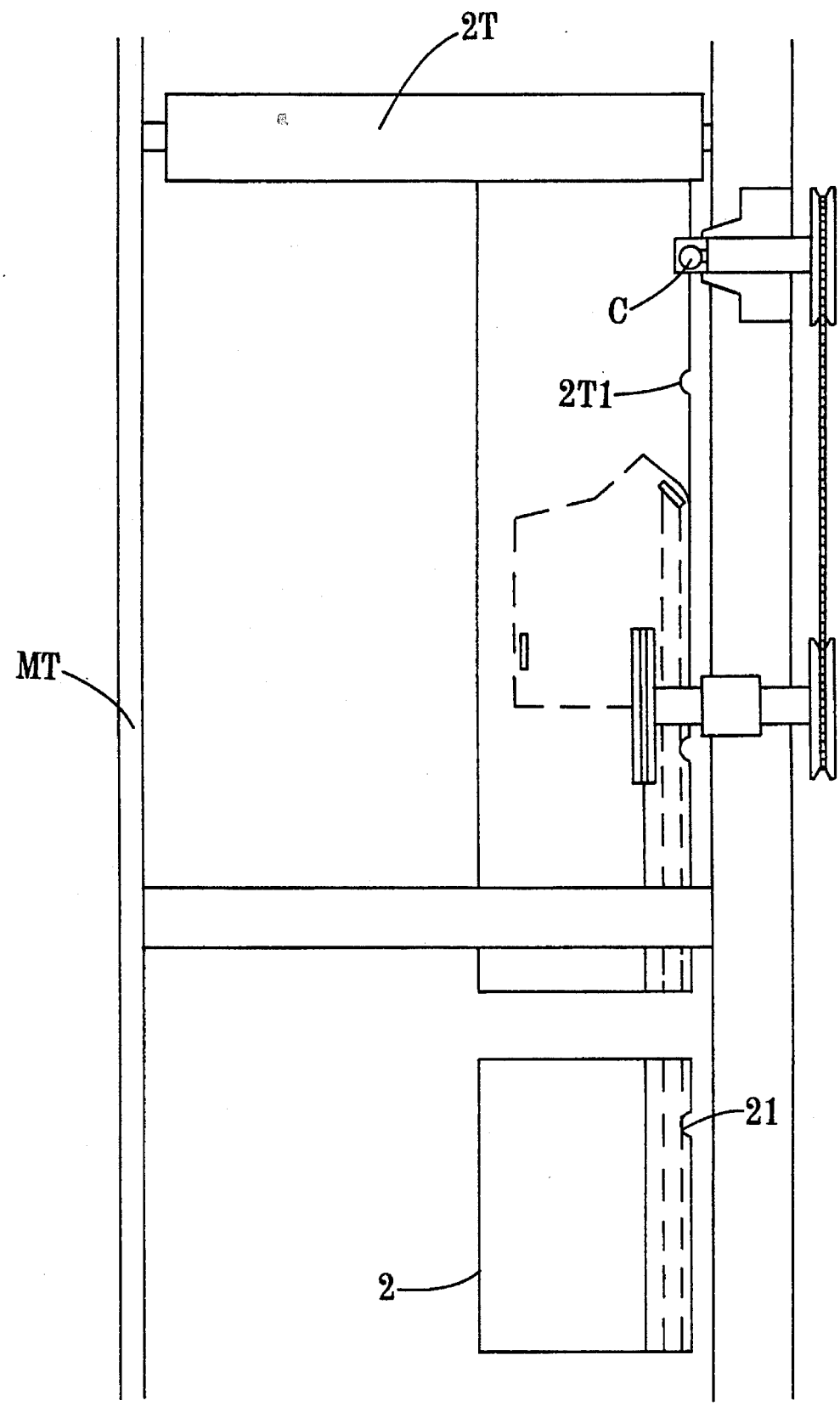
FIG. 12 is a top view of a garbage bag making machine according to the present invention.
Figure 13:
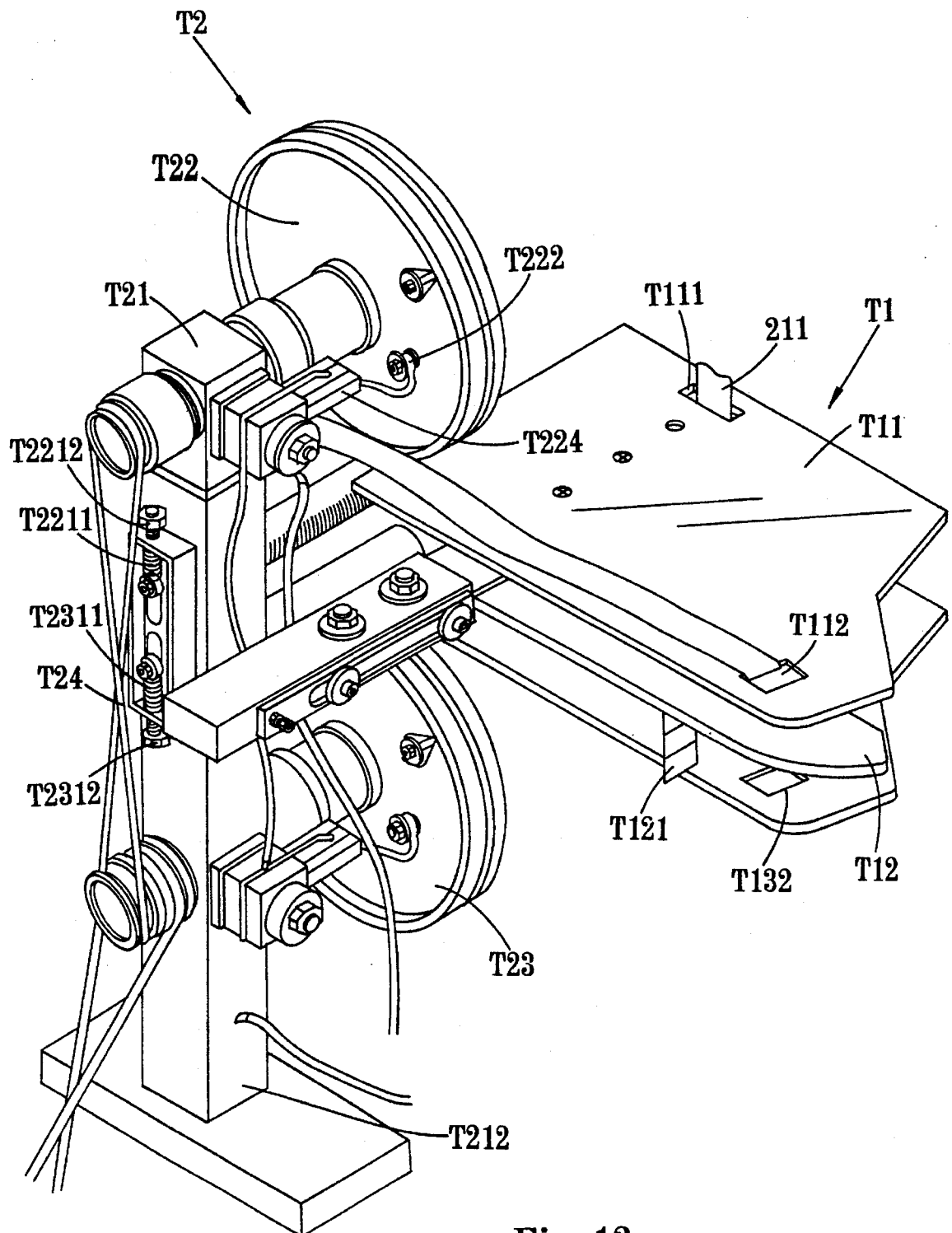
FIG. 13 is a perspective view in an enlarged scale of the garbage bag making machine of FIG. 12.
Figure 14:
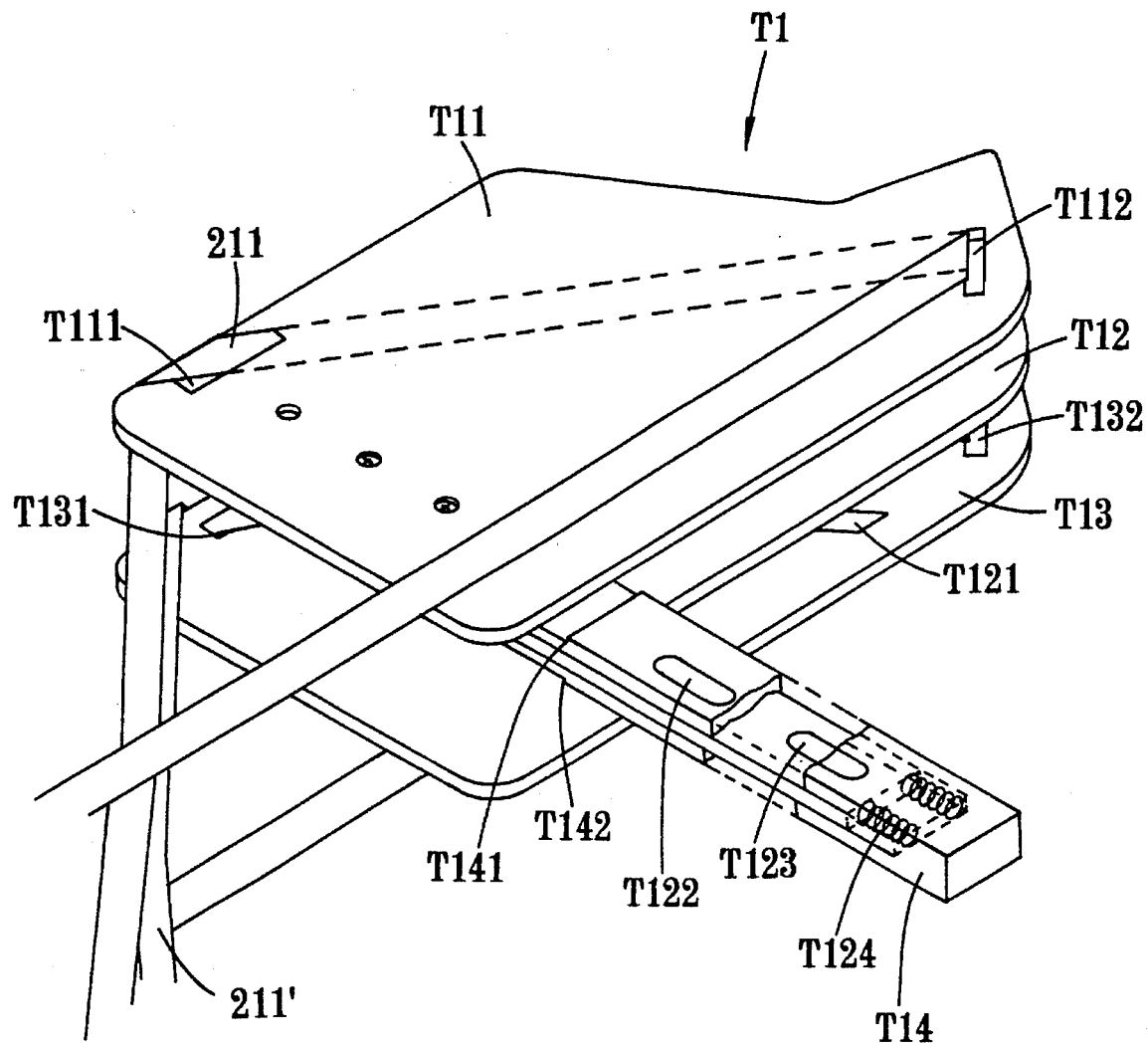
FIG. 14 is a perspective view of the feed guide assembly of the garbage bag making machine of FIG. 12.
Figure 15:
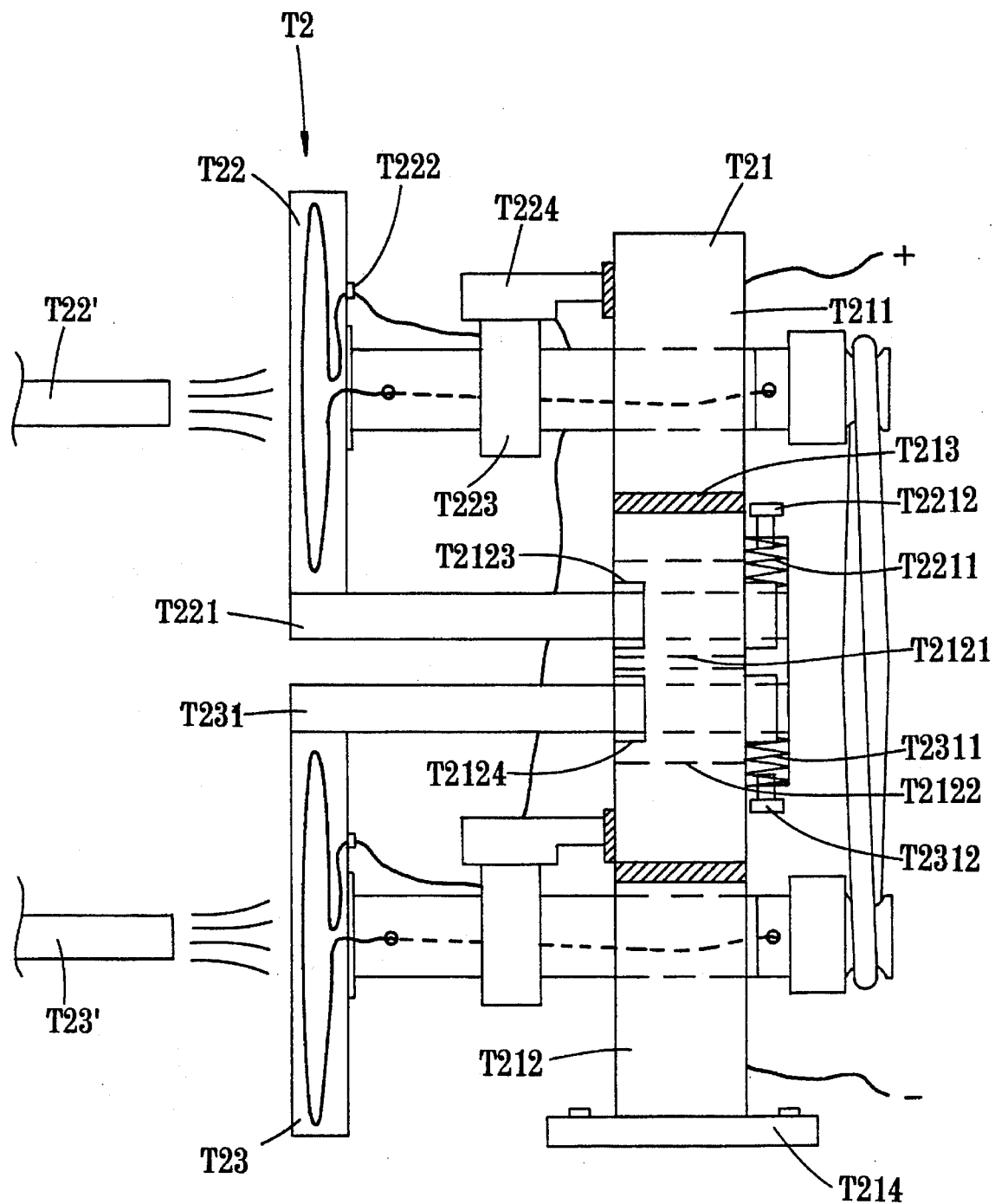
FIG. 15 is a plain view of the sealing roller assembly of the garbage bag making machine of FIG. 12.
Figure 16:
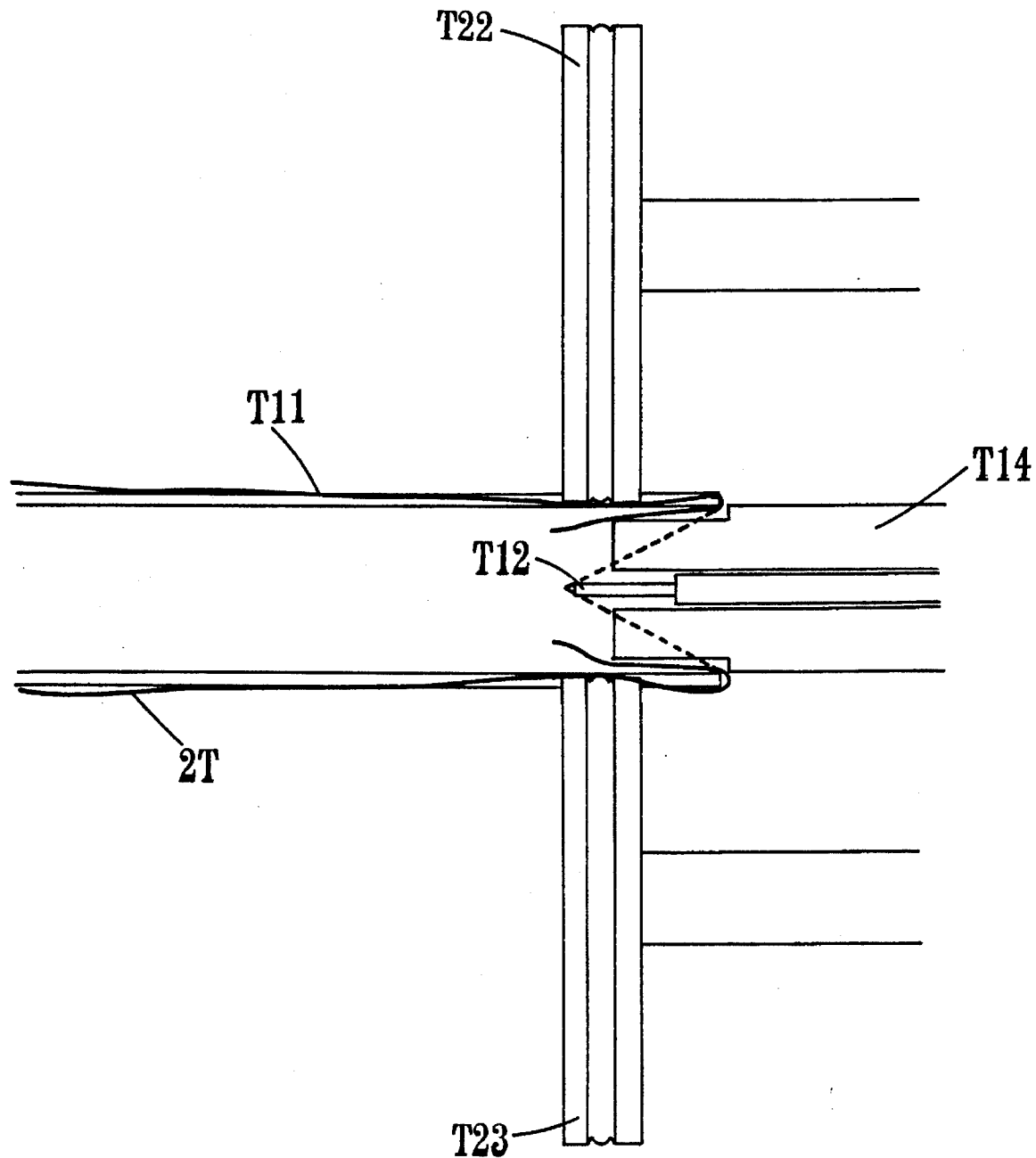
FIG. 16 shows a bag material cut open and inserted with wires by the garbage bag making machine of FIG. 12.
Figure 17:
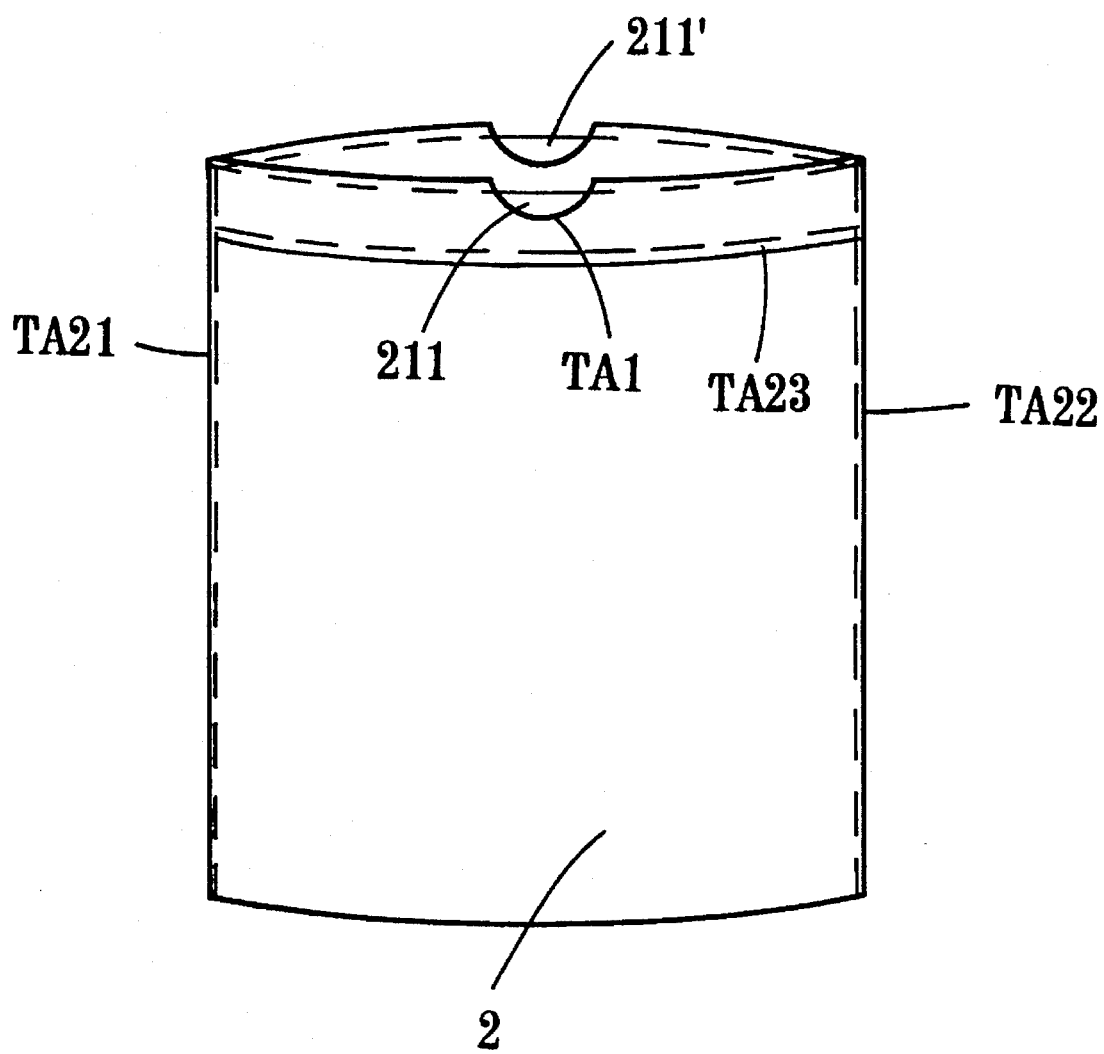
FIG. 17 shows a finished plastic bag made by the garbage bag making machine of FIG. 12.

B) With respect to the fastening of the loop of tie wire to the cap material through the automatic garbage bag making machine (with reference to FIGS. 12, 13, 14, 15, 16, and 17):

i) As shown in FIG. 14, spaces T141;T142 are maintained between the transverse support T14 and the upper and lower boards T11;T13 for passing the bag material 2T being cut opened; the intermediate board T12 may have an extension part with oblong holes T122;T123 disposed in the transverse support T14 and stopped against springs T124 on the rear end of the transverse support T14. The transverse support T14 has screws (not shown) inserted into the oblong holes T122;T123 to hold the intermediate board T12 in place, and therefore the intermediate board T12 can be automatically adjusted to fit the bag material 2T to be cut.

ii) As shown in FIG. 15, the heat sealing source of the sealing roller assembly T2 can be an electric heater. In order to obtain a constant heat sealing temperature, two identical electric heating wires may be respectively mounted on the rollers T22;T23 and then connected in series to power supply.

iii) As shown in FIGS. 13 and 15, the upright support T21 is divided into an upper power supply zone T211 and a lower power supply zone T212, with a first insulator T213 insulated between the upper and lower power supply zones T211;T212 and a second insulator T214 insulated at the bottom of the lower power supply zone T212. The upper sealing roller T22 which is made of metal is installed in the upper power supply zone T211. An electric heating wire (not shown) is covered within an insulator on the upper sealing roller T22 and electrically connected to a contact T222 insulated from the upper sealing roller T22. The contact T222 is electrically connected to an coaxial copper ring T223, which is insulated from the upper sealing roller T22. The copper ring T223 has an opposite end connected to a carbon brush T224, which is moved to contact the upper power supply zone T211. The lower sealing roller T23 is mounted on the lower power supply zone T212, having a similar mechanism connected to the electric heating wire of the upper sealing roller T22. Through the supply of a constant voltage, the sealing roller assembly T2 is activated to provide a stable heat source for sealing.

iv) As shown in FIGS. 13 and 15, the auxiliary rollers T221;T231 are respectively inserted into holes T2121;T2122 on the upright support T21 having each one end disposed in contact with either sealing roller T22 or T23 and an opposite end inserted through a respective axle bearing T2123 or T2124 in the hole T2121 or T2122 and coupled to a respective spring T2211 or T2311 controlled by a respective adjusting screw T2212 or T2312. Therefore, the auxiliary rollers T221;T231 can be slightly and respectively oscillated on the axle bearings T2123;T2124 to automatically adjust the pitch between the upper and lower sealing rollers T22;T23 according to the thickness of the bag material 2T to be processed.

v) As shown in FIG. 12, a punching machine C is driven by the sealing roller assembly T2 through a cam drive, to punch holes 2T1 on the bag material 2T for inserting the wires 211;211'.

vi) As shown in FIG. 15, the upper and lower sealing rollers T22;T23 are operated to clamp the bag material for letting it to be sealed by the electric heating wires thereof. There is a set of air nozzles T22';T23' mounted on the automatic garbage bag making machine MT opposite to the sealing roller assembly T2, through which currents of cooling air are driven toward the sealing rollers T22;T23 to cool down the sealing rollers T22;T23 so that the bag material 2T can be smoothly sealed.

vii) The operation of the garbage bag making machine MT is described hereinafter with reference to FIGS. 12 and 16 again. As the bag material 2T passes through the feed guide assembly T1, one lateral side of the bag material 2T is cut open by the cutting blade T121 and formed into two ">" shaped folding edges respectively covered on the wires 211;211' being carried on the feed guide assembly T1, and then the ">" shaped folding edges are respectively sealed by the sealing roller assembly T2, and therefore a plastic garbage bag with a tie wire is thus made.

viii) As shown in FIG. 17, the plastic garbage bag TA2 made according to the aforesaid procedure has two opposite sealing edges TA21;TA22 longitudinally disposed on two opposite sides, two opposite close channels TA23 transversely connected between the sealing edges TA21;TA22 at the top, and two wire segments 211;211' respectively received in the close channels TA23. The close channels TA23 have a respective opening TA1 in the middle through which the wire segments 211;211' are respectively pulled out for fastening with each other. The finished products from the garbage bag making machine MT may be printed with patterns and advertising matters so that they can be used as carrying bags for shoes, foodstuffs, etc.

What is claimed is:

1. A machine for manufacturing a shirt covering and raincoat synchronously from body materials and a stack of cap materials comprising a sealing mechanism for sealing said cap materials to body materials, and a shape forming mechanism for continuously welding an arched sealing line on said body materials between adjacent two cap materials, wherein:

said sealing mechanism is comprised of a locating frame, a belt conveyor, and a sealing die set, the locating frame of said sealing mechanism being made from a hollow frame having a short bottom rod affixed to the machine at the top to carry a first cutter, and a long top tube transversely spaced above the machine, the belt conveyor of said sealing mechanism being installed inside said long top tube and comprised of a motor and a transmission belt driven by said motor, said transmission belt having a series of teeth spaced around an outside surface thereof, the sealing die set of said sealing mechanism comprising a circular bottom die mounted on one end of said long top tube, and a circular sealing die controlled to press on said bottom die, said bottom die comprising a center through hole in line with said long top tube, and an annular, heat resisting plastic cushion on an inner side thereof around the center through hole, said sealing die comprising a blocked die body, a heat sealing source on an inner side of said blocked die body, an air nozzle in the center of said blocked die body;

said shape forming mechanism is comprised of an intermediate shifting mechanism, a sealing die set, and a sorting conveyor, the intermediate shifting mechanism of said shape forming mechanism comprising vertically spaced big rollers and vertically spaced small rollers, transmission belts linked between said vertically spaced big rollers and said vertically spaced small rollers, a nozzle tube disposed in parallel with said big and small rollers at a lower elevation and having a series of air nozzles for sending out air from an air supply device toward the body material being delivered out of said intermediate shifting mechanism, and a second cutter, the sealing die set of said shape forming mechanism comprising an arched sealing die reciprocated vertically above a top table on the machine by an air pump thereof through a set of racks and transmission gears thereof, the arched sealing die of the sealing die set of said shape forming mechanism having a guide groove on an arched top end thereof through which said second cutter is moved to pass, said sorting conveyor of said shape forming mechanism comprising a first netting device and a second netting device, said first and second netting devices having a respective outer frame, the outer frame of either netting device having one side hinged to the top table of the machine, the outer frame of said first netting device being made in an arched shape coupled to a gear meshed with a rack and moved by an air pump to turn said first netting device on the top table of the machine, said first netting device being received within the arched sealing die of the sealing die set of said shape forming mechanism as said first netting device is turned to a horizontal position and disposed on the top table of the machine, said second netting device being mounted on a locating frame on a rear end of the top table of the machine, the locating frame comprising front flywheel assembly, a rear flywheel assembly, and a plurality of transmission belts linked between said front flywheel assembly and said rear flywheel assembly, the outer frame of said second netting device being coupled to a gear meshed with a rack and moved by an air pump to turn said second netting device on the top table of the machine.

2. The machine of claim 1 wherein the teeth on the transmission belt of said sealing mechanism are screws respectively fastened to the transmission belt.

3. The machine of claim 2 wherein the teeth on the transmission belt of said sealing mechanism are nail heads respectively fastened to the transmission belt.

4. The machine of claim 1 wherein the sealing die of the sealing die set of said sealing mechanism comprises an annular flange on an inner side thereof facing toward the bottom die of the sealing die set of said sealing mechanism, a groove around said annular flange, and an electric heating wire covered within an insulator and set in said groove.

5. The machine of claim 1 wherein the sealing die of the sealing die set of said sealing mechanism is coupled to a link reciprocated by an air pump device.

6. The machine of claim 1 wherein the sealing die of the sealing die set of said sealing mechanism comprises an annular nozzle tube mounted on a blocked outer surface thereof, said annular nozzle tube having a plurality of air nozzles.

7. The machine of claim 1 wherein the transmission belts of said intermediate shifting mechanism of said shape forming mechanism are made of coiled springs; the rollers of said intermediate shifting mechanism have aligned notches for passing said cap materials.

8. The machine of claim 1 wherein the nozzle tube of said intermediate shifting mechanism is coupled to a reciprocating rod driven by an air pump to alternatively move up and down.

9. The machine of claim 1 wherein the sealing die set of said shape forming mechanism is driven to alternatively move up and down by gears and racks; a spring pressure board is fastened around the sealing die set of said shape forming mechanism and moved down to press on said body material as the sealing die set of said shape forming mechanism is lifted from said body material after each sealing process.

10. The machine of claim 1 wherein the outer frame of either netting device is a tube having air holes and coupled to an air suction device.

11. The machine of claim 1 wherein the outer frame of either netting device is a tube having air holes and coupled to an air supply device.

12. The machine of claim 1 wherein said first and second netting devices are comprised of a respective netting formed of spaced elastic bands, and respectively supported on a respective buffer spring, the buffer spring being released as the respective netting device is disposed in a respective vertical position.

* * * * *